(12) United States Patent
Tanner et al.

(10) Patent No.: US 7,578,431 B2
(45) Date of Patent: Aug. 25, 2009

(54) PROXIMITY PAYMENT CARD WITH PRINTED INDICATION OF SWITCH LOCATION

(75) Inventors: Colin Tanner, Middlesex (GB); Simon Phillips, York (GB)

(73) Assignee: Mastercard International, Inc., Purchase, NY (US)

( * ) Notice: Subject to any disclaimer, the term of this patent is extended or adjusted under 35 U.S.C. 154(b) by 397 days.

(21) Appl. No.: 11/516,370

(22) Filed: Sep. 6, 2006

(65) Prior Publication Data

US 2008/0054078 A1    Mar. 6, 2008

(51) Int. Cl.
*G06K 19/06* (2006.01)
(52) U.S. Cl. ............... 235/375; 235/492; 235/380; 235/487; 705/14
(58) Field of Classification Search .......... 235/492, 235/380, 487; 705/14
See application file for complete search history.

(56) References Cited

U.S. PATENT DOCUMENTS

| 3,927,282 | A | * | 12/1975 | Firstenberg ............ 379/447 |
|---|---|---|---|---|
| 5,276,311 | A | | 1/1994 | Hennige |
| 5,585,787 | A | | 12/1996 | Wallerstein |
| 5,821,516 | A | * | 10/1998 | Vandenengel .......... 235/441 |
| 5,955,961 | A | | 9/1999 | Wallerstein |
| 6,315,195 | B1 | | 11/2001 | Ramachandran |
| 6,353,811 | B1 | | 3/2002 | Weissman |
| 6,631,849 | B2 | | 10/2003 | Blossom |
| 6,715,679 | B1 | | 4/2004 | Infosino |
| 6,764,005 | B2 | | 7/2004 | Cooper |
| 6,863,220 | B2 | | 3/2005 | Selker |
| 2002/0170960 | A1 | * | 11/2002 | Ehrensvard et al. ....... 235/380 |
| 2006/0252601 | A1 | * | 11/2006 | Baum ..................... 482/9 |
| 2008/0054081 | A1 | * | 3/2008 | Mullen ................... 235/494 |
| 2008/0065492 | A1 | * | 3/2008 | Halbur et al. ............ 705/14 |
| 2008/0149735 | A1 | * | 6/2008 | Kozlay ................... 235/492 |

* cited by examiner

*Primary Examiner*—Allyson N Trail
(74) *Attorney, Agent, or Firm*—Buckley, Maschoff & Talwalkar LLC (57) ABSTRACT

An identification token includes a body and an RFID IC embedded in the body. An antenna is also embedded in the body and is coupled to the RFID IC. A switch is embedded in the body and coupled to at least one of the RFID IC and the antenna. The switch is located at a switch location in the body. The switch is actuatable by being pressed by a user's finger. The identification token also includes a printed indication on the body for indicating the switch location to the user of the identification token.

18 Claims, 10 Drawing Sheets

PROXIMITY PAYMENT CARD WITH PRINTED INDICATION OF SWITCH LOCATION

BACKGROUND

Proximity payment cards are in widespread use. A well known standard for such cards has been promulgated by MasterCard International Incorporated, the assignee hereof, and is referred to as "PayPass". Proximity payment cards typically include a radio frequency identification (RFID) integrated circuit (IC) embedded in a card-shaped plastic body. An antenna is also embedded in the card body. The antenna allows the card to receive a power signal from a point of sale terminal. The antenna is also used by the RFID IC to transmit the payment card account number, and possibly other information as well, to the POS terminal.

It has been proposed to include in a proximity payment card a switch that may be actuated by being pressed by the cardholder's finger. Actuation of the switch may complete a circuit between the RFID IC and the antenna to allow the card to receive the power signal from the POS terminal. With this arrangement, the card is normally disabled (i.e., when the switch is not actuated), but can be enabled by actuating the switch when it is desired to present the card to the POS terminal. Because the card is normally disabled, it may be immune from attempts to surreptitiously interrogate the card in order to obtain the payment card account number for fraudulent purposes.

According to some proposals, a dimple may be formed on the outer surface of the card to indicate to the cardholder where to press the card to actuate the switch in order to enable the card for reading. However, providing a dimple on the card may increase the manufacturing cost of the card and may cause other disadvantages, including an increase in the thickness of the card.

DETAILED DESCRIPTION

In general, and for the purpose of introducing concepts of embodiments of the present invention, a switch that is actuatable by being pressed by a user's finger is incorporated in a proximity payment card. The location of the switch is indicated to the user by a printed indication on the surface of the card.

Figure 1:
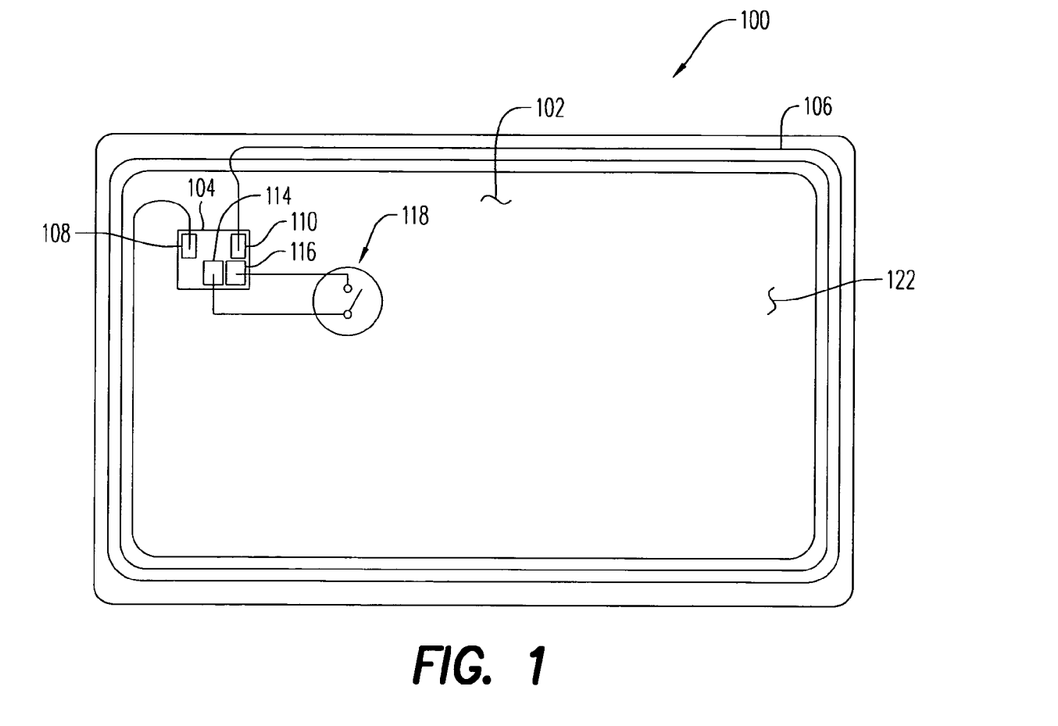
FIG. 1 is a schematic plan view of a proximity payment card according to some embodiments.

FIG. 1 is a schematic plan view of a proximity payment card 100 according to some embodiments. The proximity payment card 100 may include a card-shaped body 102, which may resemble conventional payment cards in shape and size. The card-shaped body 102 may be formed of plastic or another suitable material.

The proximity payment card 100 may also include an RFID IC 104. The RFID IC 104 may be mounted and/or installed in any suitable manner in the card-shaped body 102. For example, the RFID IC 104 may be embedded (partially or completely) in the card-shaped body 102. The RFID IC 104 may be suitably designed and configured to transmit payment card account information by radio frequency signaling to a POS terminal. In general, the RFID IC 104 may be designed and configured to operate in accordance with the "PayPass" standard promulgated by MasterCard International Incorporated, the assignee hereof.

The proximity payment card 100 may further include an antenna 106 embedded in or otherwise mounted on the card-shaped body 102. As shown, the antenna 106 may be in the form of several loops arranged along the periphery of the card-shaped body. Alternatively, the antenna 106 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

In the particular embodiment shown in FIG. 1, the RFID IC 104 may have connection terminals 108, 110, 114 and 116. In other embodiments, the number of connection terminals may be more or fewer than the number shown in FIG. 1. The antenna 106 may be coupled to the RFID IC 104 via terminals 108, 110, each coupled to a respective end of the antenna 106.

The proximity payment card 100 may also include a switch 118 schematically shown at 118. The switch 118 may be embedded or otherwise mounted in or on the card-shaped body 102. In some embodiments the switch 118 may be actuatable by being pressed by the user's finger. For example, the switch may be a pressure sensing device, as described, for example, in co-pending commonly-assigned patent application Ser. No. 11/503,197, filed Aug. 11, 2006. In some embodiments the switch may include quantum tunneling composite (QTC). By using such a material, a very thin switch may be made which is quite suitable for being embedded in the card body, without altering the standard thickness of the resulting proximity payment card. In alternative embodiments, a switch with mechanical contacts, as disclosed in U.S. Pat. No. 6,863,220, may be employed. In still other embodiments, a membrane switch or still other types of switch may be employed.

The switch 118 may be coupled to the RFID IC 104 via the terminals 114, 116 of the RFID IC 104. With this arrangement, the switch 118 may be operated to provide an input signal to the RFID IC 104. The input signal may cause the proximity payment card 100 to be enabled and/or may select a payment card account number for transmission to the POS terminal (not shown) from among a number of payment card account numbers stored in the RFID IC 104. In alternative embodiments, either or both of terminals 114, 116 may not be present and the manner of coupling the switch 118 may be varied. For example, the switch 118 may be coupled in series with the antenna 106 such that receiving of the power signal via the antenna 106 may be disabled except when the switch 118 is actuated. Alternatively, the switch 118 may be interfaced to the RFID IC 104 using one or both of the antenna terminals 108, 110 as disclosed in co-pending, commonly-assigned patent application Ser. No. 11/517,072, filed Sep. 7, 2006. In another alternative embodiment, terminal 114 may be present, but not terminal 116, and the switch 118 may be coupled to the RFID IC 104 by terminals 114 and 110, for example.

In some embodiments, lettering (not shown in FIG. 1) or other symbols (not shown in FIG. 1) may be present on the front surface 122 of the card-shaped body 102 and/or on the rear surface (not shown in FIG. 1) of the card-shaped body 102. The proximity payment card 100 may have one or more magnetic stripes (not shown) on the card-shaped body 102 to allow the proximity payment card 100 to be read by a magnetic card reader. In addition, or alternatively, there may be embossed numbers and/or letters on the card-shaped body to indicate one or more account numbers and/or the name of the holder of the proximity payment card 100. In addition, or alternatively, non-embossed printing on the front surface 122 may indicate the account numbers and/or the holder's name. Still further, the front surface 122 of the card-shaped body 102 may carry one or more logos and/or brands, including for example the brand/logo of a national payment card association such as MasterCard International Incorporated. The brand/logo of the issuer may also be present, as well as, for example, a specific card product brand. Other conventional features that may be present on the proximity payment card 100 (though such features are not shown) are an adhesive paper strip to receive the signature of the cardholder, and a security code or the like printed on the adhesive strip.

Figure 2:
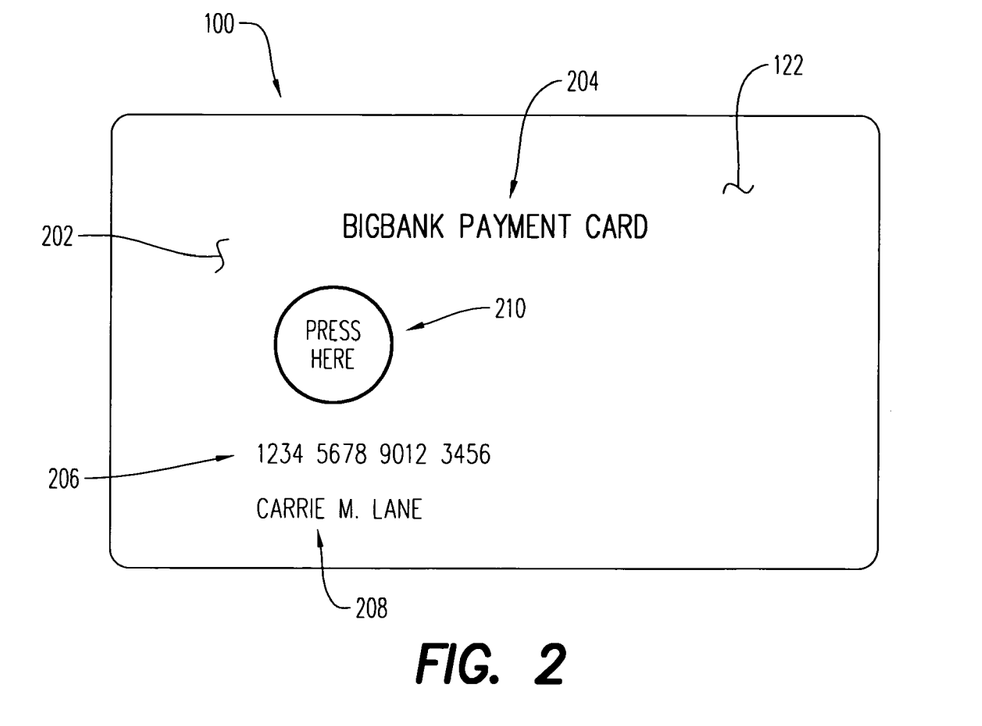
FIG. 2 is a view of a simplified example of the front surface of the card of FIG. 1.

FIG. 2 presents the visual appearance of a simplified example of the front surface 122 of the proximity payment card. As seen from FIG. 2, the front surface includes a background 202 which may be white or may be one or more other background colors. In addition printed information is provided against the background 202. The printed information may be presented in black or in one or more other colors that contrasts with the background colors. The printed information may include the brand name and/or name of the issuer for the payment card, as indicated at 204. The printed information may further include a visual representation 206 of the payment card account number stored in the RFID IC 104, and the cardholder's name 208. In addition, and in accordance with embodiments of the invention, the printed information includes an indication 210 of the location at which the switch 118 (FIG. 1, not shown in FIG. 2) is located in the card body. Thus the indication 210 indicates to the cardholder (the user) where on the card body the user should press with his/her finger to actuate the switch.

The indication 210, like the other printed information, may be printed on the card body by a conventional technique, such as with conventional ink printing. The indication 210 may, but need not, be printed at the same time, and/or with the same ink as the other printed information. In some embodiments, the indication 210 may be printed with a layer of ink that is sufficiently thin such that the indication 210 is effectively flush with the front surface 122 of the card 100. In other embodiments, the indication 210 may be printed with a sufficient thickness such that the indication 210 may be tactilely detectable by the user in contrast to the front surface 122. ("Tactilely detectable" means detectable by a human by sense of touch.) It will be recognized from FIG. 2 that if the indication 210 has sufficient thickness to be tactilely detectable, it may also have a non-uniform thickness such that one or more recesses are formed in the indication 210. The recess(es) may be formed by a region(s) of reduced or zero thickness of the indication 210 such that the recess(es) too is (are) tactilely detectable. Thus the indication 210 may have a texture that tactilely distinguishes the indication 210 from the background surface. In addition or alternatively, the texture of the surface 122 at the location of the indication 210 may have a contrasting texture relative to the rest of the surface where the difference in texture is created by a technique other than printing. For example, the card body may be molded so as to form a different texture (relative to the balance of the surface) on the front surface of the card at the switch location. In another embodiment, the contrasting texture or another feature at the switch location could be formed by providing a corresponding feature on a plate used to laminate the card body. It will be appreciated that a feature on the laminating plate may be transferred to the surface of the card body. In still another embodiment, a shallow recess may be provided at the switch location to keep a tactilely-detectable printed indication from being smoothed during lamination.

Figure 3:
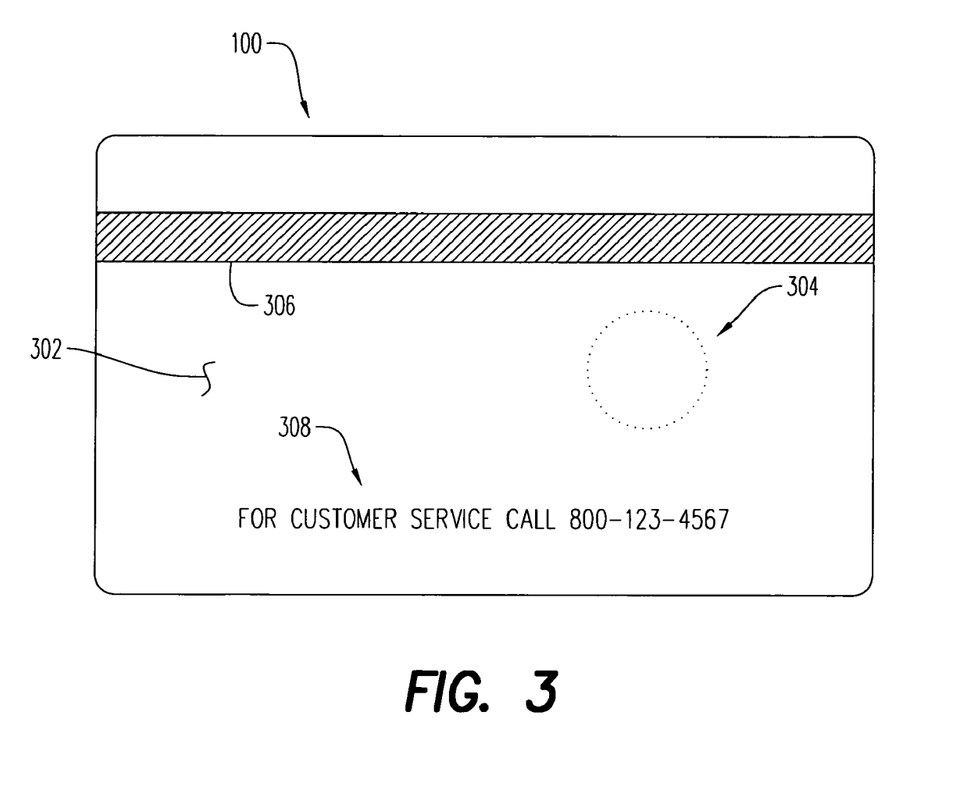
FIGS. 3 and 3A are views of a simplified example of the rear surface of the card of FIGS. 1 and 2.
Figure 3A:
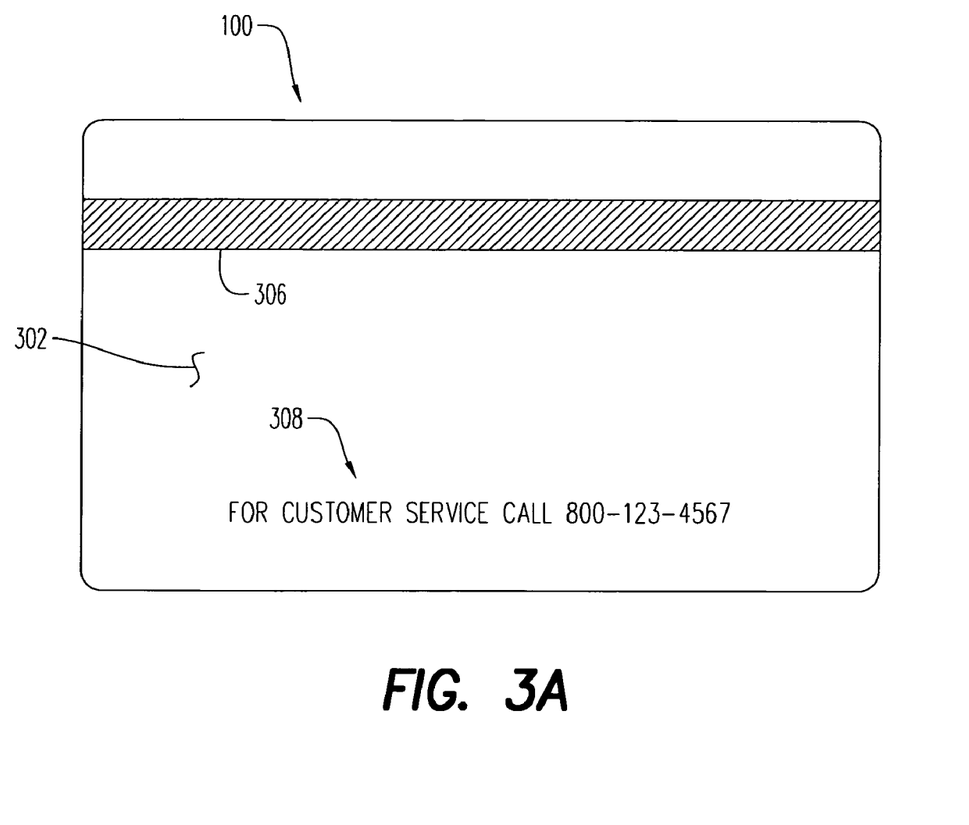

FIGS. 3 and 3A are views of a simplified example of the rear surface 302 of the card 100. The difference between these two drawings is that in FIG. 3 the location of the switch 118 (FIG. 1) is indicated in phantom at 304, for purposes of explanation, although in practice the rear surface 302 of the card 100 may lack any indication of the switch location, and therefore may be more accurately depicted by FIG. 3A. In some embodiments the switch may be of a type (e.g. pressure-sensitive/QTC) which is operable either by pressing the front of the card at indication 210 (FIG. 2) or by pressing the rear of the card at location 304 (FIG. 3). However, for some reason or reasons (such as the cosmetic appearance of the card or placement of other features), it may be desired not to provide an indication of the switch location on the back of the card. The rear surface may, for example, have features such as a magnetic stripe 306 or a notice 308 of a customer service toll-free telephone number.

In operation, the user presents the proximity payment card 100 to a point of sale terminal (not shown) while pressing the front surface of the card at location 210 to actuate the switch 118. The RFID IC may be powered up by an interrogation signal from the POS terminal (more specifically from a proximity coupling device included in the POS terminal). In response to the actuation of the switch 118, the RFID IC 104 takes an action that it would not have taken but for the actuation of the switch 118. Thus, the RFID IC 104 may be said to have taken an action in response to actuation of the switch 118. For example, the RFID IC 104 may store two different payment card account numbers, and may output (transmit) one of the account numbers, in response to actuation of the switch 118, at a time when the proximity payment card is being interrogated by a point of sale terminal. If the switch 118 is not actuated at a time when the proximity payment card is being interrogated, the RFID IC may output the other one of the two account numbers.

As another example, the actuation of the switch may be required for operation of the proximity payment card. That is, in such embodiments, either actuation of the switch is required to complete the circuit to the antenna, or the RFID IC 104, although powered by an interrogation signal received via the antenna 106, operates to transmit the account number only if the RFID IC 104 detects that the switch 118 is being actuated.

Figure 4:
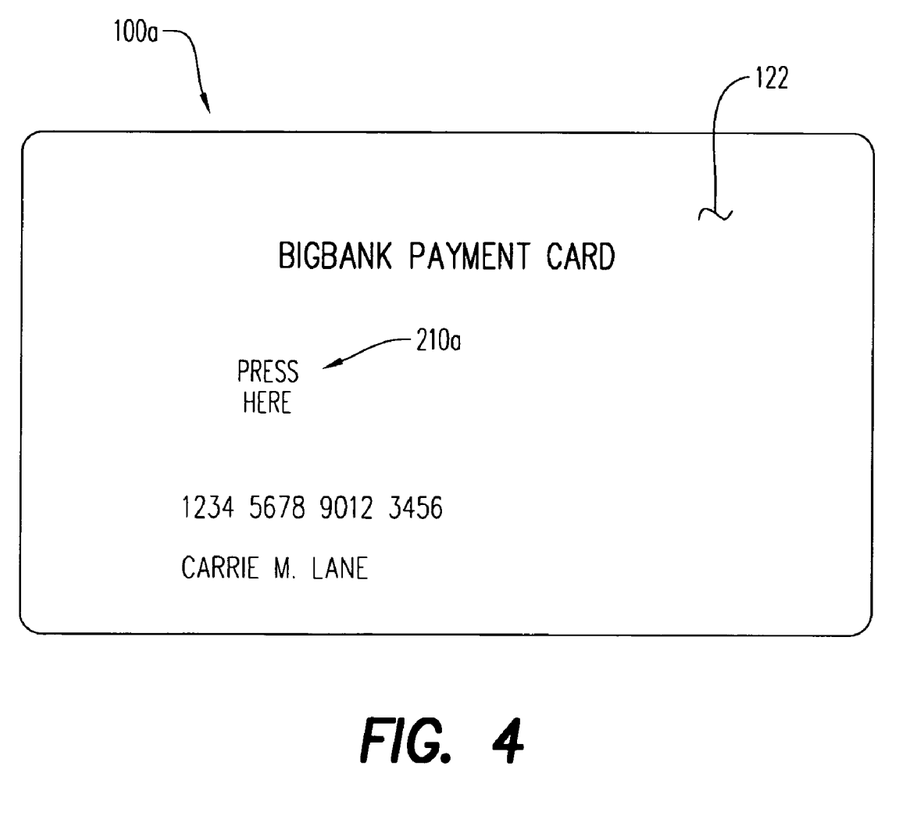
FIGS. 4-6 are views of other simplified examples of the front surface of the card of FIG. 1.
Figure 5:
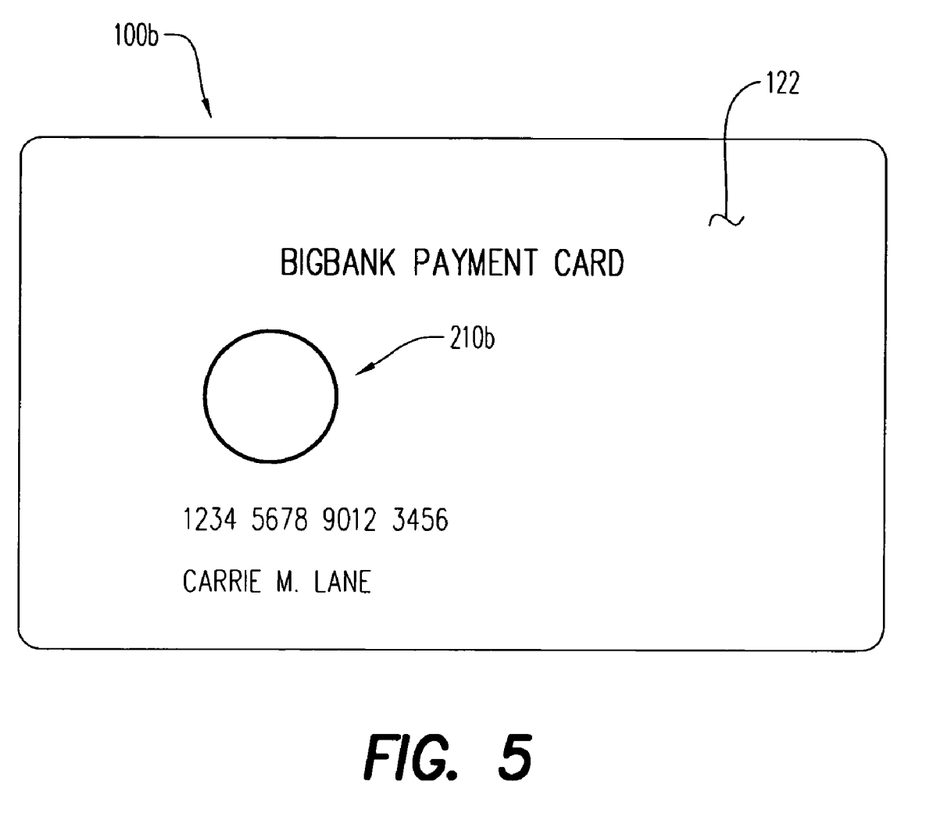
Figure 6:
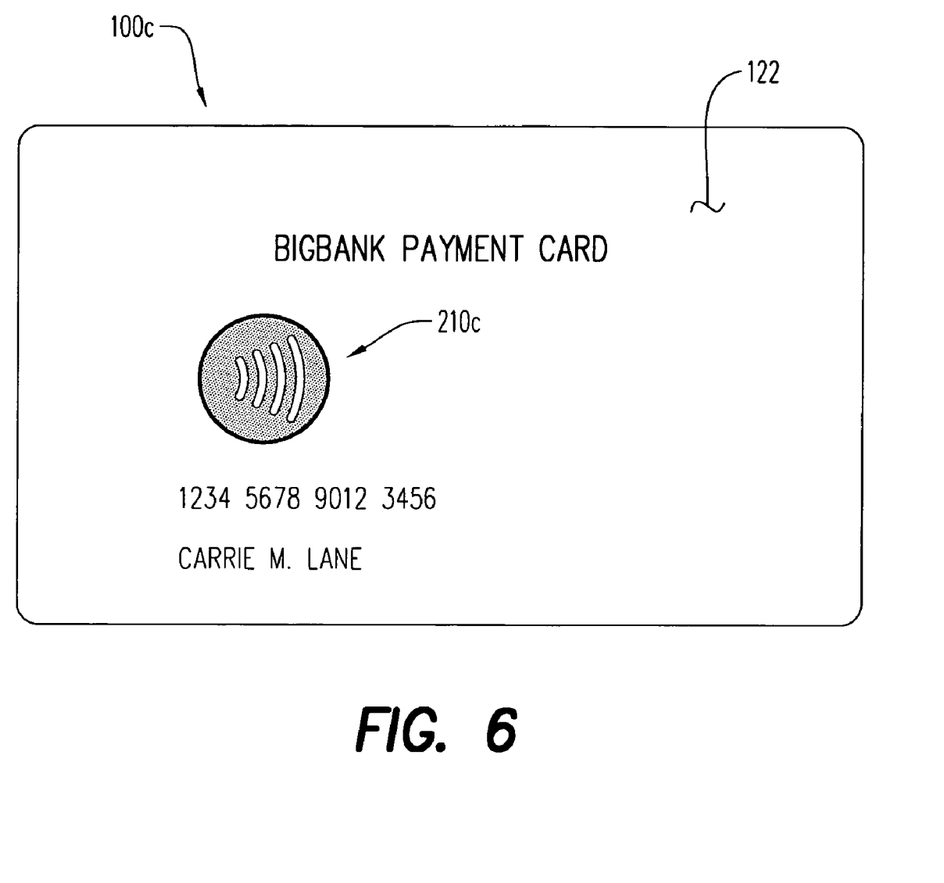

FIGS. 4-6 are views of other simplified examples of the front surface 122 of the proximity payment card. In these alternative examples, the indication of the switch location may have an appearance that is different from that shown in FIG. 2. Alternative examples of the indication are shown at 210a in FIG. 4, at 210b in FIG. 5 and at 210c in FIG. 6.

Figure 7:
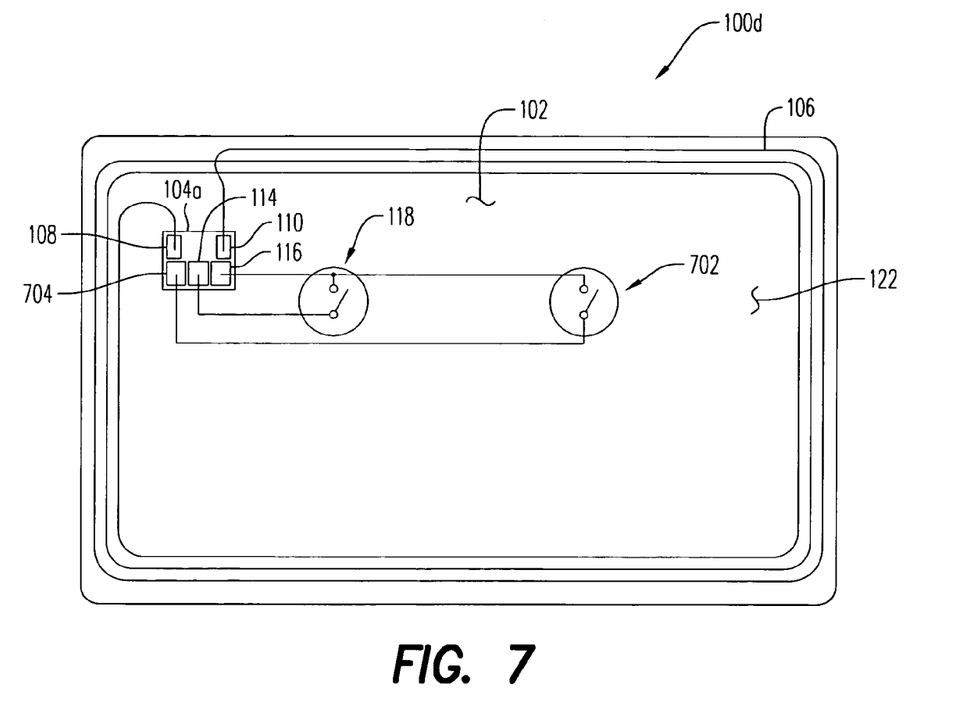
FIG. 7 is a schematic plan view of a proximity payment card according to some other embodiments.

FIG. 7 is a schematic plan view of a proximity payment card 100d according to some other embodiments. The card 100d may differ from card 100 of FIG. 1 principally in that the card may have two switches incorporated therein rather than one. In particular, card 100d has a switch 702 coupled to the RFID IC 104*a* by a terminal 704 and by terminal 116, which is shared with switch 118. The switch 702 may be embedded in the card body 102 and may, but need not, be of the same type as switch 118.

In some embodiments, the RFID IC 104*a* may store two or more different payment card account numbers. The user may select among the account numbers by actuating one of more of the switches while presenting the card to a POS terminal.

Figure 8:
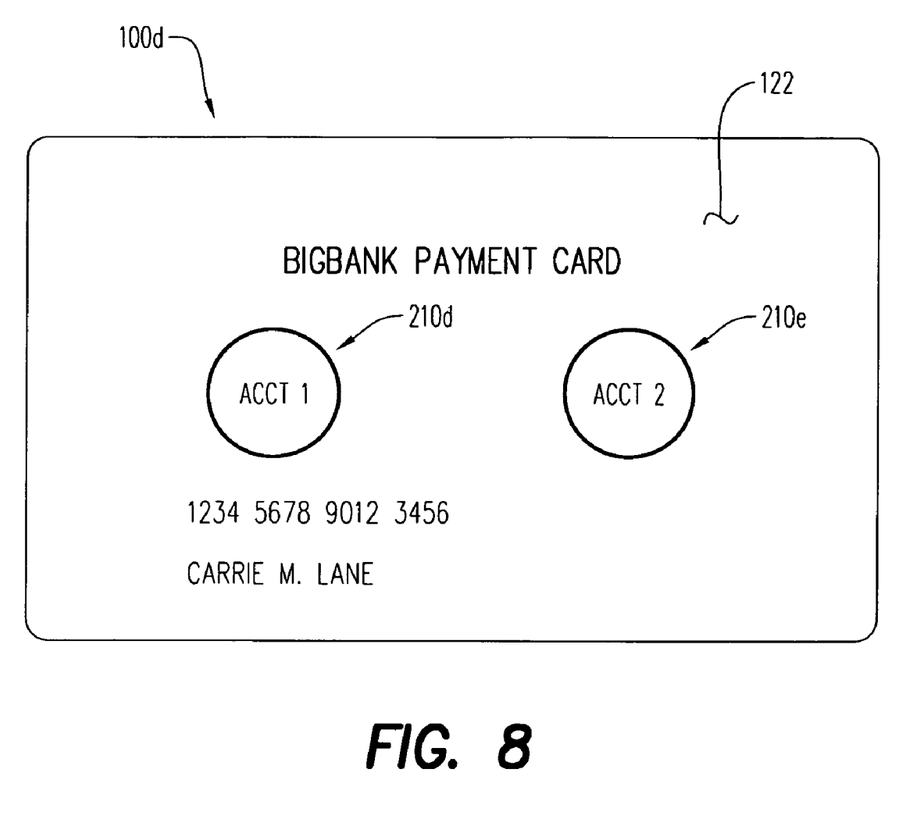
FIG. 8 is a view of a simplified example of the front surface of the card of FIG. 7.

FIG. 8 is a view of a simplified example of the front surface of the card 100*d* of FIG. 7. It will be noted that the front surface has printed thereon two indications 210*d*, 210*e* to mark the respective locations of the two switches 118, 702 shown in FIG. 7. Except perhaps in the specific wording included in the indications, the indications shown in FIG. 8 may resemble any one of the embodiments of the indication 210 as discussed above in conjunction with FIG. 2. In the example shown in FIG. 8, two indications 210*d*, 210*e* may have mutually different wordings to indicate mutually different payment card accounts that are accessible by actuating one or the other of the two switches. Other types of wording and/or coding may be employed to visually distinguish the two different switch locations.

In operation of the proximity payment card 100*d*, the user presents the card to a point of sale terminal while actuating one of the switches by pressing the front surface of the card at one of the indications 210*d*, 210*e*. The RFID IC is powered up by an interrogation signal from the POS terminal (more specifically from a proximity coupling device included in the POS terminal). In response to detection of actuation of a particular one of the switches, the RFID IC may take an action called for by actuation of that switch. For example, the RFID IC may store two different payment card account numbers, and may output (transmit) a first one of the account numbers if it detects that a first one of the switches is actuated, but would output the second account number if it detects that the other one of the switches is actuated, and would not output either account number if neither switch is actuated. In another embodiment, the RFID IC may store three account numbers and may output the first account number if only one switch is actuated, output the second account number if only the other switch is actuated, output the third account number if both switches are actuated, and output no account number if neither switch is actuated. In still another embodiment, the RFID IC may store four account numbers and may output the first account number if only one switch is actuated, output the second account number if only the other switch is actuated, output the third account number if both switches are actuated, and output the fourth account number if neither switch is actuated.

Figure 9:
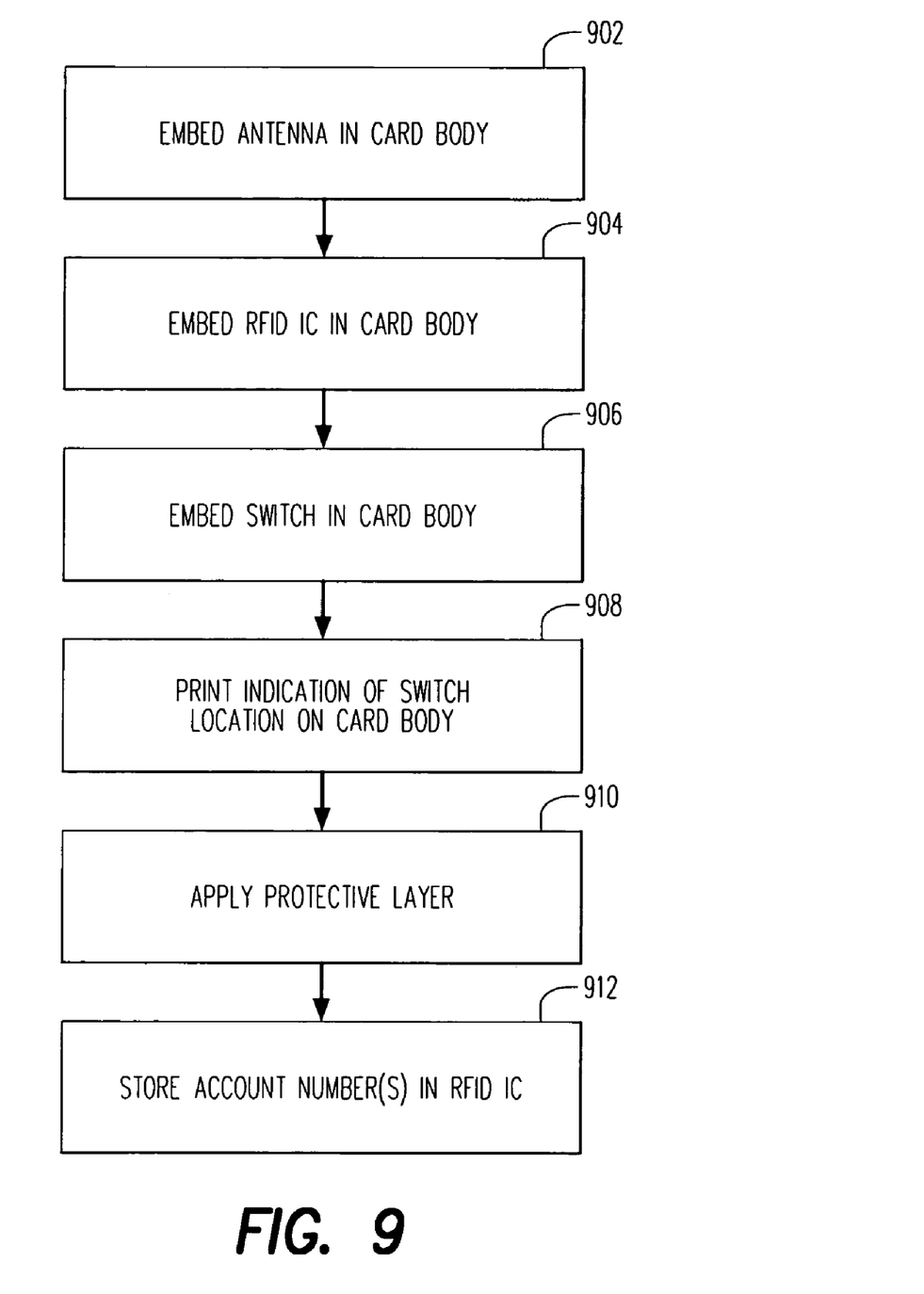
FIG. 9 is a flow chart that illustrates aspects of a process for making a proximity payment card in accordance with aspects of the present invention.

FIG. 9 is a flow chart that illustrates aspects of a process for making a proximity payment card in accordance with aspects of the present invention. The process may be used for example, to manufacture a card like the card 100 described with reference to FIGS. 1-3A.

At 902 in FIG. 9, an antenna is embedded in a card-shaped body. This may be done in a conventional manner.

At 904, an RFID IC is embedded in the card body. At 906, a user-actuatable switch (e.g., one operated in response to being pressed by the user's finger) is embedded in the card body. According to some embodiments, steps 904 and 906 may be implemented in accordance with teachings of co-pending application Ser. No. 11/503,197 by making an RFID module that includes both an RFID IC and a pressure sensitive switch and embedding or otherwise installing the RFID module in the card body.

At 908, an indication like indication 210 is printed on the front surface of the card body at the locus of the user-actuatable switch. At 910, a protective layer may be applied to protect the switch location indication and/or other markings on the front surface from wear, etc. At 912, at least one payment card account number may be stored, in a conventional manner, in the RFID IC.

The process of making the card may include other steps that are not specifically illustrated in FIG. 9. For example, the process may include forming and programming a magnetic stripe on the card body. The printing of the switch-location indication may be accomplished as part of a step in which other information is also printed on the card body.

Embodiments have heretofore been described with reference to a card-shaped proximity payment device, but the teachings disclosed herein are also applicable to proximity payment devices which are not card-shaped. As used herein and in the appended claims, "proximity payment device" refers to any device, whether or not card shaped, which transmits to a point of sale terminal, by wireless transmission, a payment account number.

Although not indicated in the drawings, one or more of the proximity payment devices may have a contact interface like that of a conventional smart card that includes a contact interface.

The principles taught herein have heretofore been described in the context of proximity payment devices. Nevertheless, these teachings are also applicable to cards or the like issued by transportation systems (e.g., mass transit systems) for access to the transportation systems; to cards used to identify the holder for purposes apart from or in addition to transaction payments; and to so-called electronic passports (also known as RFID-enabled passports). As used herein and in the appended claims the term "identification token" refers to an object that serves as one or more of a proximity payment device, a transportation card, an identification card and/or an RFID-enabled passport. The term "transportation card" refers to a card or similar device used to pay, or confirm or evidence payment of, a charge for using a transportation system. The term "RFID-enabled passport" refers to an internationally recognized travel document that includes an IC and an antenna and communicates with a terminal by a wireless communication technique.

The above description and/or the accompanying drawings are not meant to imply a fixed order or sequence of steps for any process referred to herein; rather any process may be performed in any order that is practicable, including but not limited to simultaneous performance of steps indicated as sequential.

As used herein and in the appended claims, the term "embedded" includes both completely and partially embedded. As used herein and in the appended claims, a "pressure sensitive material" is a material that responds to pressure by changing its degree of electrical conductivity.

The embodiments heretofore described have included one or two user-actuatable switches, but alternative embodiments may include three or more user-actuatable switches. The number of switch-location indications provided on the front surface of the card may be equal to or less than the number of user-actuatable switches included in the card. One or more switch-location indications may be provided on the rear surface of the card in addition to or instead of the switch-location indications shown on the front of the card. The switch locations need not be at the locations illustrated in the drawings.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A proximity payment card comprising:
   a body;
   a radio frequency identification (RFID) integrated circuit (IC) embedded in the body, said RFID IC storing a first payment card account number and a second payment card account number different from said first payment card account number;
   an antenna embedded in the body and coupled to the RFID IC;
   a first switch embedded in the body and coupled to the RFID IC, the first switch located at a first switch location in the body, the first switch actuatable by being pressed by a user's finger for selecting the first payment card account number for transmission from the proximity payment card;
   a second switch embedded in the body and coupled to the RFID IC, the second switch located at a second switch location in the body, the second switch location different from the first switch location, the second switch actuatable by being pressed by the user's finger for selecting the second payment card account number for transmission from the proximity payment card;
   a first printed indication on the body for indicating the first switch location to the user of the proximity payment card and for indicating that the first switch is for selecting the first payment card account number; and
   a second printed indication on the body for indicating the second switch location to the user of the proximity payment card and for indicating that the second switch is for selecting the second payment card account number.

2. The proximity payment card of claim 1, wherein the body is card-shaped and has a front planar surface, the first printed indication and the second printed indication being located at the front planar surface of the card-shaped body.

3. The proximity payment card of claim 2, wherein each of the first printed indication and the second printed indication has a thickness sufficient for the respective printed indication to be tactilely detected by the user in contrast to the front planar surface of the card-shaped body.

4. The proximity payment card of claim 3, wherein a respective tactilely detectable recess is formed in the thickness of each of the first printed indication and the second printed indication.

5. The proximity payment card of claim 2, wherein each of the first printed indication and the second printed indication has a color or tone that contrasts with a background color or tone on the front planar surface.

6. The proximity payment card of claim 2, wherein each of the first printed indication and the second printed indication has a texture that contrasts with a texture on the front planar surface.

7. The proximity payment card of claim 2, wherein:
   the card-shaped body has a rear planar surface that is opposite the front planar surface;
   each of the first switch and the second switch is actuatable by the user pressing a respective rear switch location on the rear planar surface; and
   the rear planar surface has no indication of the rear switch locations.

8. The proximity payment card of claim 1, wherein each of the first switch and the second switch includes a pressure-sensitive material.

9. The proximity payment card of claim 1, wherein the first switch and the second switch are embedded in the body so as not to be visible to the user.

10. The proximity payment card of claim 1, wherein the first switch and the second switch are embedded in the card such that there is no indication that the first switch and the second switch are present other than said first printed indication and said second printed indication.

11. A method of manufacturing a proximity payment card, the method comprising:
    embedding an antenna in a card-shaped body;
    embedding a radio frequency identification (RFID) integrated circuit (IC) in the card-shaped body so that the RFID IC is coupled to the antenna, said RFID IC storing a first payment card account number and a second payment card account number different from said first payment card account number;
    embedding a first pressure-sensitive switch in the card-shaped body such that the first switch is coupled to the RFID IC;
    embedding a second pressure-sensitive switch in the card-shaped body such that the second switch is coupled to the RFID IC;
    printing a first indication on the card-shaped body to indicate a location of the first switch and to indicate that the first switch is for selecting the first payment card account number for transmission from the proximity payment card; and
    printing a second indication on the card-shaped body to indicate a location of the second switch and to indicate that the second switch is for selecting the second payment card account number for transmission from the proximity payment card.

12. The method of claim 11, further comprising:
    applying a protective layer to the card-shaped body over the first printed indication and the second printed indication.

13. A proximity payment card comprising:
    a card-shaped body having a front planar surface, the surface having at least one background color;
    a radio frequency identification (RFID) integrated circuit (IC) embedded in the body, the RFID IC storing a first payment card account number and a second payment card account number different from the first payment card account number;
    an antenna embedded in the body and coupled to the RFID IC;
    a first pressure-sensitive switch embedded in the body at a first switch location and coupled to the RFID IC, the first switch actuatable by being pressed by a user's finger for selecting the first payment card account number for transmission from the proximity payment card;
    a second pressure-sensitive switch embedded in the body at a second switch location and coupled to the RFID IC, the second switch actuatable by being pressed by the user's finger for selecting the second payment card account number for transmission from the proximity payment card;
    a first printed indication on the front planar surface of the card-shaped body, the first printed indication being in a color that contrasts with the at least one background color of the front planar surface, the first printed indication located on the front planar surface so as to indicate the first switch location to a user of the proximity payment card, the first printed indication for indicating that the first switch is for selecting the first payment card account number; and a second printed indication on the front planar surface of the card-shaped body, the second printed indication being in a color that contrasts with the at least one background color of the front planar surface, the second printed indication located on the front planar surface so as to indicate the second switch location to the user of the proximity payment card, the second printed indication for indicating that the second switch is for selecting the second payment card account number.

14. The proximity payment card of claim 13, wherein each of the first switch and the second switch includes quantum tunneling composite.

15. The proximity payment card of claim 13, wherein each of the first printed indication and the second printed indication has a thickness sufficient for the respective printed indication to be tactilely detected by the user in contrast to the front planar surface of the card-shaped body.

16. The proximity payment card of claim 15, wherein a respective tactilely detectable recess is formed in the thickness of each of the first printed indication and the second printed indication.

17. The proximity payment card of claim 13, wherein each of the first printed indication and the second printed indication has a texture that contrasts with a texture on the front planar surface.

18. The proximity payment card of claim 13, wherein the first switch and the second switch are embedded in the card such that there is no indication that the first switch and the second switch are present other than said first printed indication and said second printed indication.

* * * * *